(12) United States Patent
Bone et al.

(10) Patent No.: US 6,694,631 B2
(45) Date of Patent: Feb. 24, 2004

(54) ALIGNMENT DEVICE UTILIZING COMPONENTS RESPONSIVE TO GRAVITY

(75) Inventors: Daniel Bone, Durham (GB); George Ch Fung, Tseung Kwan O (HK)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/958,701

(22) PCT Filed: Feb. 12, 2001

(86) PCT No.: PCT/GB01/00596

§ 371 (c)(1),
(2), (4) Date: Jan. 11, 2002

(87) PCT Pub. No.: WO01/59405

PCT Pub. Date: Aug. 16, 2001

(65) Prior Publication Data

US 2002/0133959 A1 Sep. 26, 2002

(30) Foreign Application Priority Data

Feb. 11, 2000 (GB) ................................................ 0003202

(51) Int. Cl.[7] .......................... B23B 45/14; G01C 9/00
(52) U.S. Cl. ...................... 33/333; 33/334; 33/366.24; 33/391; 408/16
(58) Field of Search .......................... 33/333, 334, 365, 33/366.11, 366.12, 366.15, 366.16, 366.17, 366.23, 366.24, 366.27, 374, 375, 391, 395, 398, 402, 401, 286; 408/16, 124, 241 R; 200/332.1, 332.2, 293.1, 522, 61.85, 113; 310/68 A (56) References Cited

U.S. PATENT DOCUMENTS

| 466,380 | A | * | 1/1892 | Spencer | 33/365 |
|---|---|---|---|---|---|
| 819,339 | A | * | 5/1906 | Cleland | 33/398 |
| 2,020,238 | A | * | 11/1935 | Cantaluppi | 33/402 |
| 2,310,166 | A | * | 2/1943 | Way | 362/119 |
| 2,525,588 | A | * | 10/1950 | Cameron et al. | 362/119 |
| 2,877,561 | A | * | 3/1959 | Morse | 33/368 |
| 3,279,071 | A | * | 10/1966 | Bilyeu et al. | 33/265 |
| 4,027,127 | A | * | 5/1977 | Dummer | 200/522 |

(List continued on next page.)

Primary Examiner—Christopher W. Fulton
Assistant Examiner—R. Alexander Smith
(74) Attorney, Agent, or Firm—Harness, Dickey & Pierce, P.L.C.

(57) ABSTRACT

A level indicator utilizing an alignment device, together with a power tool utilizing such a level indicator to determine when such a tool is held in a horizontal or vertical plane. An alignment device (10) has a first component part (12) with an arcuate track (14) with a track following member in the form of a ball bearing (28) to follow the track under the influence of gravity to seek an equilibrium position. The body has a signal input (18) and a signal output port (20) and the second component part has an alignment member axially mounted within the body in restraining engagement with the track following member (28) so as to be rotationally displaceable within the body in response to displacement of the track following member (28) whereby alignment between the alignment member and the input and output ports in response to displacement of the alignment member by the ball bearing, effects operation of an indicator means to provide an indication that such alignment between the alignment member and the alignment ports has been achieved.

28 Claims, 6 Drawing Sheets

U.S. PATENT DOCUMENTS

| | | | | |
|---|---|---|---|---|
| 4,054,766 A | * | 10/1977 | Kramer | 200/522 |
| 4,063,366 A | * | 12/1977 | Bane | 33/396 |
| 4,078,869 A | * | 3/1978 | Honeycutt | 408/16 |
| 4,179,644 A | * | 12/1979 | Vassos | 318/17 |
| 4,189,726 A | * | 2/1980 | Rosa et al. | 340/689 |
| 4,241,298 A | * | 12/1980 | Trammell et al. | 318/17 |
| 4,253,242 A | * | 3/1981 | McInerney | 33/366.12 |
| 4,286,125 A | * | 8/1981 | Schaffeler et al. | 200/6 B |
| 4,459,522 A | * | 7/1984 | Huber | 318/293 |
| 4,663,505 A | * | 5/1987 | Drake | 219/722 |
| 4,703,315 A | * | 10/1987 | Bein et al. | 340/689 |
| 4,973,205 A | * | 11/1990 | Spaulding | 408/16 |
| 5,025,567 A | * | 6/1991 | McWilliams et al. | 33/348.2 |
| 5,084,598 A | * | 1/1992 | Nagata et al. | 200/16 C |
| 5,157,842 A | * | 10/1992 | Swanda | 33/365 |
| 5,199,177 A | * | 4/1993 | Hutchins et al. | 33/348.2 |
| 5,398,422 A | * | 3/1995 | Clarkson | 33/365 |
| 6,104,105 A | * | 8/2000 | Schaeffeler et al. | 307/125 |
| 6,111,331 A | * | 8/2000 | Fisher et al. | 310/68 A |
| 6,281,456 B1 | * | 8/2001 | Ogden | 200/61.46 |
| 6,318,874 B1 | * | 11/2001 | Matsunaga | 362/119 |

* cited by examiner

ALIGNMENT DEVICE UTILIZING COMPONENTS RESPONSIVE TO GRAVITY

The invention relates to an alignment device for indicating alignment between two component parts and, more particularly, to a level indicator comprising such an alignment device which is particularly suitable for use in a power tool.

It is well known that a pivotally mounted and weighed body will seek an equilibrium position under the influence of gravity. A particular and specific digital angle indicator device utilising this principle is disclosed in U.S. Pat. No. 4,253,242 which shows an axially mounted and weighted disk, rotatably mounted relative to a fixed body. The weighted portion of the disk is responsive to gravity and rotates relative to the body. The body comprises an indicator surface used to align the body to a horizontal plane in such a position the disk will have aligned itself relative to the body so that apertures in the disk will allow the transmission of light from a light source to a light detector through one of a plurality of holes in the disk, detection of the light source indicating the alignment and thus the obtaining of a horizontal or predetermined angular plane. However, a device of this type requires very accurate manufacturing techniques and the use of jewel bearings to allow appropriate and free rotation of the disk within the body. In addition, since the rotatable disk utilises a balance weight in order to be responsive to gravity, such a weight provides a moment on the bearing which can be emphasised to a detrimental affect is any additional and undue force is created such as by dropping the device. This undue force could be transmitted directly through the disk to the axial bearings which could damage the bearings and alignment of the device. These drawbacks are particularly relevant to use of such a device in a robust environment.

This type of alignment device has potential uses in obtaining angle or level measurements. In many activities it is desirable to obtain a level reading, particularly within the construction industry or general DIY activities such as hanging doors or putting up shelves. The conventional method of obtaining a level is the use of a conventional spirit level utilising a simplistic arrangement of a straight sealed tube filled with a liquid and having a small bubble or air gap left in the liquid. The tube is marked with two lines whereby when the tube (usually in a flat mounting board) is laid horizontally the bubble within the tube will align between the two lines in the centre of the tube to indicate that the tube and carrier are perfectly horizontal.

An alternative method of measuring the horizontal is to utilise a simplistic pendulum having a rigid straight bar connecting the pivot point with a hanging weight together with a crossbar mounted at 90° to the vertical bar. The crossbar can be disposed either side of the pivot point whereby when the pivot level is hung and the weight achieves equilibrium the crossbar will be positioned in a horizontal plane and then its ends may be aligned with two notches on a carrier board to align the board to the horizontal and thus measure the horizontal. These are simplistic mechanical devices for measuring the horizontal level.

However, the drawbacks of conventional levels of this type are their sensitivity and unwieldy size making it difficult to use in certain applications. In particular, the use of a power drill requires a preferential alignment of the tool axis horizontally or vertically to allow a hole to be bored in at 90° to an upright material or horizontal material respectively. Obviously, the use of a conventional spirit level in a drill has significant drawbacks whilst when aligning a drill to the horizontal it will be effective to indicate when the drill is level (in the same manner as a conventional spirit level) but once the drill is activated, the vibrations caused by the power tool will be transmitted to the liquid medium in the spirit level which will then "froth" due to the vigorous vibrations. Thus, the spirit level is subsequently rendered useless. Furthermore, a liquid spirit level cannot determine a vertical plane directly. Alternatively, the use of a pendulum type level indicator of the type described above in a drill is feasible but due to its sensitivity and lack of damping together with the associated unwieldy size such a product would not be convenient for use in a drill.

It is therefore an object of the present invention to provide an alignment device which is simplistic and cost-effective to manufacture and alleviates the aforementioned problems.

It is a further object of the present invention to provide a level indicator incorporating such an alignment device and also to provide a power tool incorporating such a level indicator.

According to the present invention there is provided an alignment device for indicating alignment between two component parts, wherein a first component part comprises a main body having a concave track and a track following member restrained in engagement with and displaceable about said tack to follow said tack under the influence of gravity to seek an equilibrium position; a second component part comprises an alignment member pivotally mounted within said body and restrained in engagement with aid track following member so as to be directly pivotally displaceable in response to displacement of said track following member, said device further comprising a first alignment port and a second alignment port in said body and indicator means for providing an indication when said alignment member is in a predetermined alignment with both first and second alignment ports.

According to another aspect of the present invention there is provided a level indicator comprising this alignment device. Preferably such level indicators using this alignment device are used in power tools, particularly power drills.

There is further provided an invention relating to an electrical trigger switch for a power tool comprising a trigger having first and second elongate switching members longitudinally displaceable against a resilient biasing force into engagement with first and second electrical switching elements respectively, whereby longitudinal displacement of said trigger moves said first switching member into engagement with said first switching element to effect a first switching operation and continued longitudinal displacement of said trigger moves said second switching member into engagement with said second switching element to effect a second independent switching operation.

Specific embodiments of the present invention will now be described, by way of example only, with reference to the accompanying illustrative drawings, in which:

FIG. 7a shows a cross-sectional view of an alternative embodiment of a transmitting element of an alternative embodiment of an alignment device;

FIG. 7b is the input port of an alternative embodiment of an alignment device of FIG. 7a;

FIG. 7c is the output port of an alternative embodiment of an alignment device of FIG. 7a;

Figure 1:
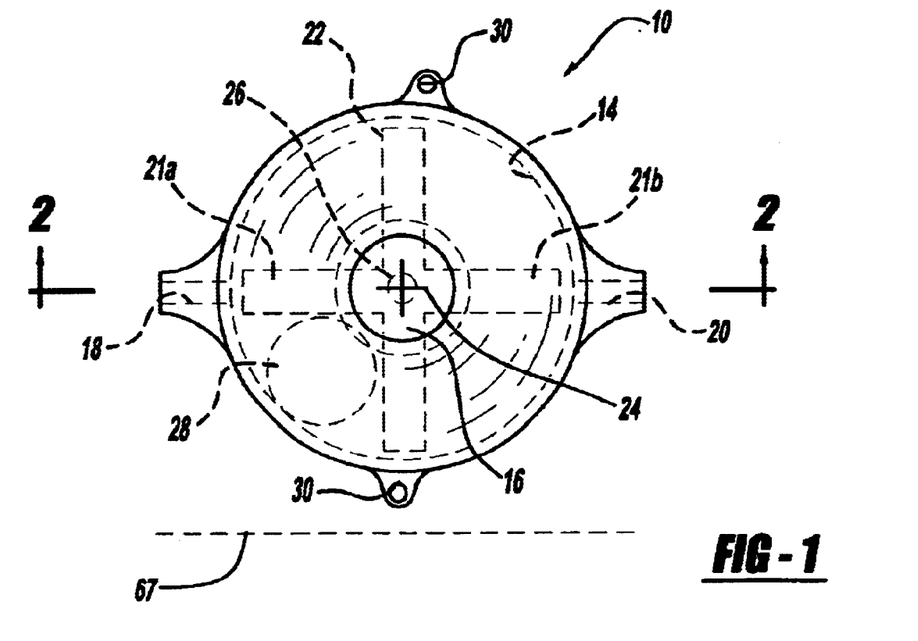
FIG. 1 is a plan elevation of an alignment device.

Referring now to FIG. 1, an alignment device (10) consists of a moulded plastics casing or main body (12) formed in two halves (12a and 12b) which are pressed and held together. The alignment device comprises a substantially toroidal track (14) formed by the two halves (12a and 12b) having a substantially flat central portion (16). The flat central portion (16) comprises an air gap extending between the two halves (12a, 12b) of the level indicator providing a direct communication between any two diametrically opposed points on an inner circumference of said track.

Figure 2:
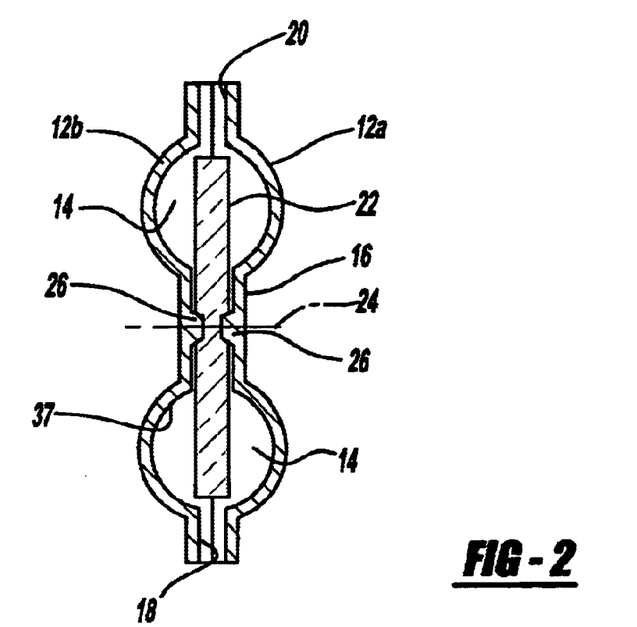
FIG. 2 is a cross-sectional view of the alignment device of FIG. 1 along the lines II—II.

Located in the outer circumference and on the equator of the alignment device (10) are diametrically opposed alignment ports in the form of a signal input port (18) and a signal output port (20) which, as seen in FIG. 2, provide a communication channel between the interior of the alignment device (10) and the outside thereof. As shown in FIG. 1, in hashed lines, and more clearly shown in cross-section in FIG. 2 is an alignment member (22) comprising light transmitting element (22) formed substantially as a symmetrical cross having four arms (21a, 21b, 23a, 23b), disposed symmetrically about a central pivot point or axis (24), so as to be positioned at right angles to each other effectively forming two substantially straight alignment bars either side of the axis (24). This light transmitting element (22) comprises a clear plastics material (such as perspex) although it will be appreciated that any light transmitting material may be utilised including a hollow channel through an opaque body. The element (22) is rotationally mounted within the alignment device (10) by projections (26) mounted on the inwardly directed faces of the flats (16) (co-axial with the toroidal track axis) so as to engage with corresponding recesses formed co-axial with the axis (24) of the element (22). As such, the element (22) is rotatably restrained within the alignment device (10) so as to be freely rotatable about the central axis of the toroidal track. In this manner, the axis of the toroidal chamber is coincident with the axis of rotation of the element (22).

Furthermore, a track following member in the form of a spherical ball bearing (28) is also mounted within the alignment device (10) within the toroidal track (14) so as to be freely displaceable about the entirety of the toroidal track. The ball bearing is shown in hashed lines in FIG. 1 although it will be appreciated that other track following members could be employed, such as a cylindrical member, provided such members are freely displaceable about the track. The diameter of the ball bearing is such as to substantially engage two adjacent arms of the cross element (22) whereby any displacement of the ball bearing within the toroidal track in either direction will cause the ball bearing (28) to engage one or other of adjacent arms of the element (22) to effect direct rotational displacement of the element (22).

The alignment device (10) also has two additional bolt holes (30) which are to allow the alignment device to be connected to a product in which it is to be incorporated for measuring or determining a level measurement, to be discussed later.

A light source (32), such as an LED or a light bulb, is placed within the input port (18) to transmit light through the input port (18) into the toroidal track (14). The output port (20) will have a light detector means attached thereto, such means could include a light sensitive diode or other light detection means but, in the present embodiment, will comprise a fibre optical cable which will be connected to a viewing window on the exterior of an article in which the alignment device (10) is mounted. As such, when the light transmitting element (22) is aligned in the manner shown in FIG. 1 so that two opposed arms (21a, 21b) are in direct alignment between the diametrically opposed input (18) and output ports (20) light generated by the light source enters through port (18) is transmitted through the light transmitting element (22) (via arms (21a, 21b)) to output port (20) where then light is transmitted through the fibre optical cable to the viewing window as mentioned above. However, if the light transmitting element (22) is rotationally displaced so that the arms (21a, 21b) are out of alignment with the input and output ports (18, 20) then light entering through the input port (18) is not transmitted to port (20) and thus no light is received at the port (20) or communicated to the associated window. Hence, light viewed at the window is indicative of alignment of the light transmitting means (22) and the associated input/output ports.

Additionally, it will be appreciated that since there are two sets of opposed arms (21, 23) on the light transmitting element (22), light will be transmitted between the ports when such an element (22) is aligned in one of four configurations so as to provide a light transmitting channel between the input (18) and output ports (20).

Figure 3:
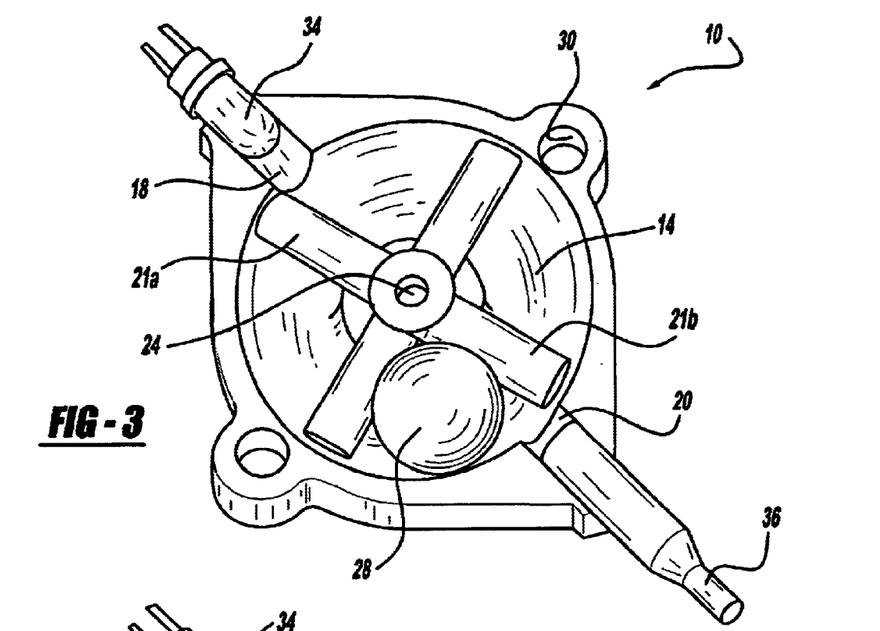
FIG. 3 is a perspective view of the internal mechanism of the alignment device as shown in FIG. 1 displaced to a non-aligned configuration.
Figure 4:
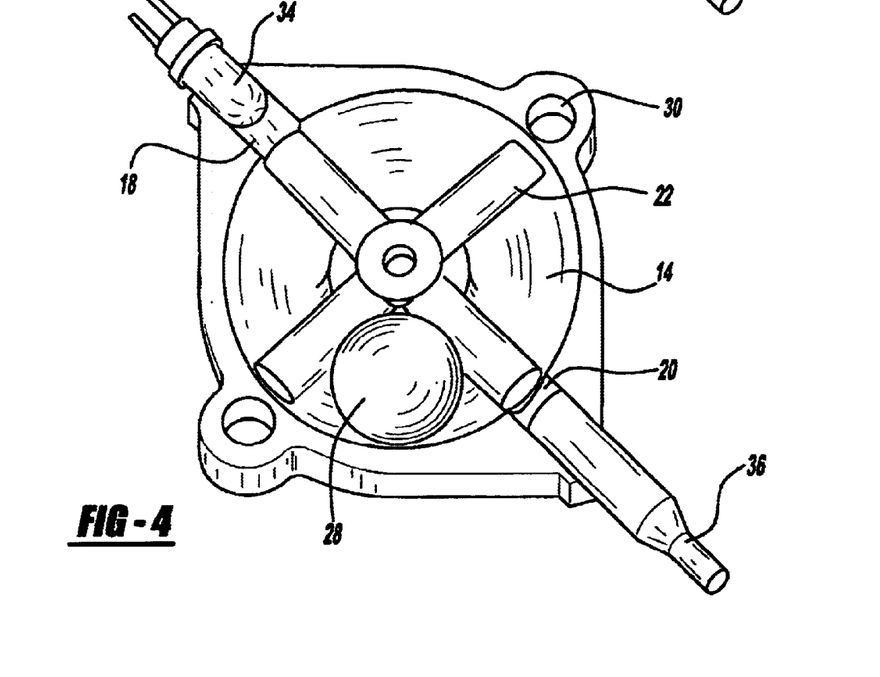
FIG. 4 is a perspective view of the internal mechanism of the alignment device as shown in FIG. 1 displaced to an aligned configuration.

Reference is now made to FIG. 3 and FIG. 4, to more clearly describe operation of the alignment device (10). Here, the input port (18) has an LED element (34) as a light source. This LED is connected to a battery via a conventional electronic circuit. The output port (20) has a fibre optical cable (36) which is connected to a viewing window (not seen). In FIG. 3, the ball bearing (28) has been displaced about the toroidal track (14) so as to engage with the element (22) to displace the arms (21a, 21b) out of alignment with the input and output ports (18, 20) so that light generated by the LED is not transmitted to the output port. In this manner, when the end user views the window connected to the fibre optical cable no light will be visible since the exterior walls of the alignment element (22) will serve to reflect and displace any light away from the output port (20). Alternatively, the element (22) may be formed of a substantially opaque material with a light transmitting channel therethrough or employ an opaque coating so as to effectively "block" any light being transmitted through the chamber (16) except when alignment is achieved between the member (22) and the two ports. The outer surface of the element (22) and inner surface of the alignment device (10) may additionally be coated with light absorbent material to reduce the possibility of reflected light, (which does not pass through element (22)), from reaching the output port (20).

Referring now to FIG. 4, here the ball bearing (28) has been displaced slightly within the toroidal track so as to displace the element (22) and effect alignment of the arms (21a, 21b) of the element (22) with the input and output ports (18, 20) respectively. In this position light generated by the LED is transmitted through the light transmitting element (22) to the output port (20) whereby such light is then transferred, via fibre optical cable, to the viewing window of the article. An end user then looking at the viewing window will see the light transmitted and understand that alignment has taken place.

Figure 5:
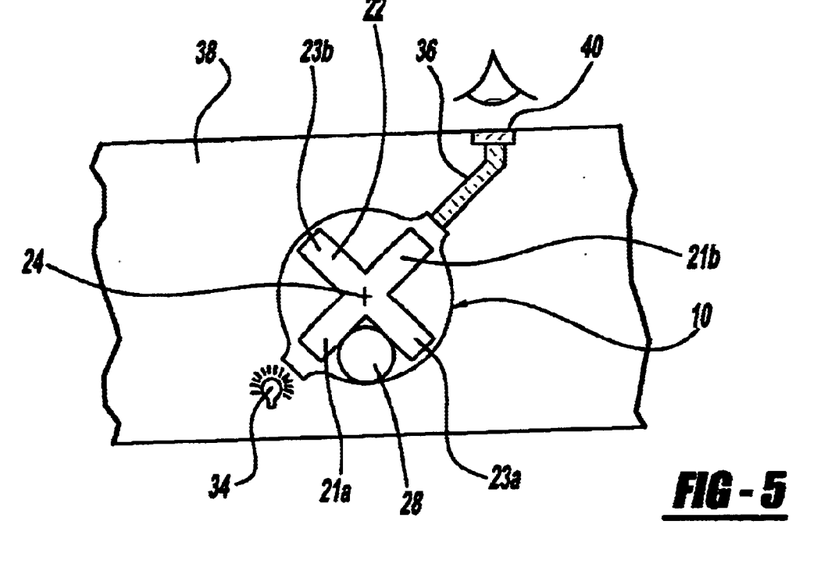
FIG. 5 is a schematic illustration of the use of the alignment device of FIG. 1 in a conventional builders spirit level used in a horizontal plane.
Figure 6:
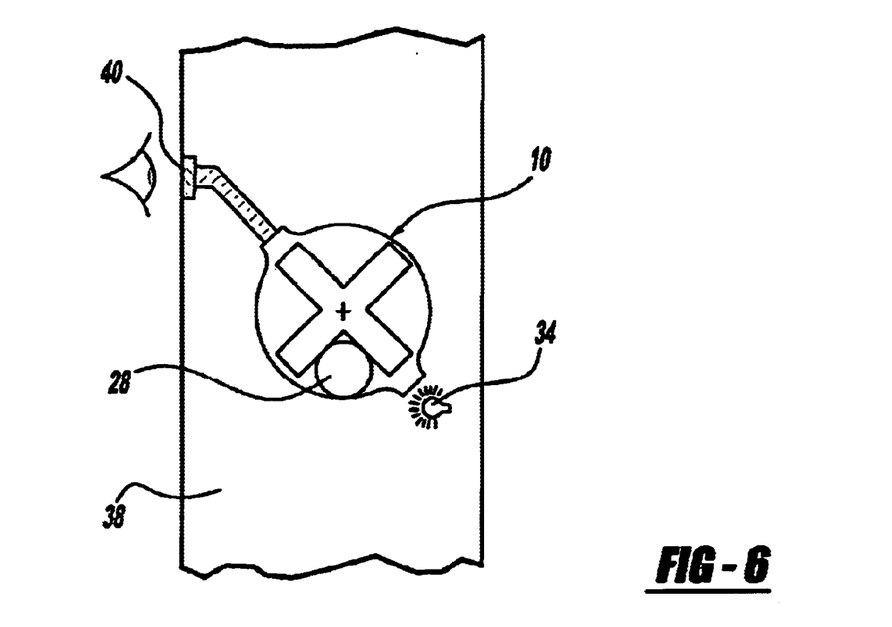
FIG. 6 is a schematic view of the use of the alignment device of FIG. 1 in a conventional builders spirit level used in a vertical plane.

In use, the alignment device (10) will be mounted in an article for which the detection of a horizontal or vertical level is required. For example, FIGS. 5 and 6 show schematically the use of the alignment device (10) mounted and restrained in a builders level (38) where it is used to replace a conventional bubble spirit level. In use the alignment device (10) is held in a vertical plane (where its axis lies in a horizontal plane substantially as shown in FIG. 2) and shown schematically in FIGS. 5 and 6. In such a vertical plane, the ball bearing (28) is free to rotate about the toroidal track (14) whereby the action of gravitational forces ensure that the ball bearing always seeks the lowest point of the toroidal track. This is clearly illustrated in FIG. 5 and FIG. 6 whereby the ball bearing lies at the bottom of the track. Thus, the alignment device (10) is mounted within the article (38) at a predetermined position whereby the track member is fixed from rotation relative to the article in order that when an indicator (i.e. a flat) surface of the article (38) lies in a substantially horizontal plane, the input port (18) and output port (20) are coincident with the arms (21a, 21b) of the element (22) (the position of the element (22) governed by engagement with the bearing (28)) to allow light entering the input port (18) to be transmitted through the element (22) to the output port (20), as shown in FIG. 5 to provide a visual indication of alignment between the component ports of the alignment device (10).

Subsequent rotation or displacement of the level (38) in a vertical plane will cause the ball bearing (28) to be displaced (under gravity) within the toroidal track (14) so as to maintain its equilibrium position at the lowest point of the toroidal track. Once the level (38) has been moved out of the horizontal position the subsequent displacement of the ball bearing (28) displaces the element (22) out of alignment between the input and output ports (18, 20). Thus, when the level is moved out of a horizontal plane, light generated at the input port (18) cannot be transmitted to port (20) and thus no light is transmitted to the viewing window (40). However, continued rotational displacement of the level (38) in a vertical plane until, such level is positioned perpendicular to the horizontal (i.e. vertically) as shown in FIG. 6, will result in the second pair of diametrically opposed arms (23a and 23b) of the element (22) to subsequently align between the input (18) and output ports (20). Thus, the alignment device (10) will again be able to transmit light from the input port (18) to the output port (20) through the light transmitting element (22) when it is held perpendicular to the horizontal (i.e. vertically). Thus the same alignment device (10) is able to detect and indicate when an object (38) is held both horizontally and vertically, as distinct from the current bubble spirit level which is only able to detect a horizontal position.

It will be appreciated that the use of a toroidal track member provides a track which effectively restrains the bearing (28) in rotational engagement with the outer periphery of said track. Thus no direct force is transmitted through the member (22) to its axial or pivot point (26). Any axially directed force directed by the bearing (28) is absorbed by a substantially inner surface (37) of the toroidal track. However, since the bearing (28) abuts two arms (21a, 22b) of the member (22) at all times, displacement of the bearing (28) results in an effective immediate displacement of the member (22) about the axis. The significant benefit to be observed here is that should the level (38) be accidentally dropped, no force is transmitted from the bearing (28) to the axis (26) of the member (22) to damage the rotational ability of such member (22).

Each of the pairs of arms of the element (22) may contain a characterising means to affect light transmitted therethrough, such that the transmitted light will be indicative of whether the light has been transmitted through the arms (21a, 21b) or arms (23a, 23b) and subsequently indicate whether the alignment device is detecting the horizontal or vertical. For example, if a white light source is utilised and the first arm (21a) of the element (22) comprises a first coloured filter (or is indeed a translucent coloured light transmitting material) then light transmitted from the input port (18) to the output port (20) will correspond to the colour of the filter material and thus when viewed through the window (40) will clearly indicate not only that alignment has been detected but which of the pairs of arms of the element (22) have been aligned. Where the alignment device (10) is used in a level (38) one set of arms may produce a first colour indicative of a horizontal plane being measured and the second pair of arms may comprise a second colour indicative of the vertical plane being detected. Conversely, both sets of arms (21 or 23) of the light transmitting element (22) may be of different colours or one may be coloured and the other clear as long as there is a distinction between the colour of the light transmitted through the different arm of such element (22). Alternatively, some other form of marking may be placed upon each of the arms (21, 23) of the element (22) which will be transmitted via the fibre optical cable to the viewing window (40) when alignment is achieved. Such marking could incorporate a light transmitting template in the form of a letter such as H for horizontal and V for vertical, which could be mounted on respective end faces of one or other of the arms (21, 23).

A further advantage of the design of the alignment device (10) is an inherent damping effect resulting from engagement of the ball bearing (28) with the toroidal track (14). Thus, as the level (38) is displaced from a first to second position, displacement of the ball bearing (28) within the toroidal track will set up a oscillating motion which, due to the engagement between the ball bearing and toroidal track will be rapidly damped by the resulting frictional forces. This helps to overcome difficulties encountered with traditional pivotal level detection means where damping of such oscillation is difficult to effect.

It will be further appreciated that the main body (12) may itself take the form of a square or rectangle whereby at least one substantially flat face of such square or rectangle may be used to measure a vertical or horizontal plane. In such an embodiment the input ports and output ports are aligned relative to this measuring face so that alignment between the member (22) and the input and output ports (18, 20) is achieved when such measuring face is disposed in a horizontal plane. As best seen in reference to FIG. 1, a hashed line (67) is shown to schematically illustrate where such a measuring plane may be disposed relative to the body (12) and it extends parallel to the straight line disposed between the diametrically opposed input and output ports (18, 20). Alternatively, if an alignment device (10) is required to be more compact then it may simply utilise a line or other indicator means etched on the exterior surface of the body (such as a straight line or a series or two or more points)

whereby such an indicator means represents a reference line indicative of a horizontal plane (or vertical plane) when alignment of the device is achieved. In particular, the use of a line or series of points on the device itself may be useful in aligning the device in a predetermined orientation within an article where detection of a horizontal vertical level is required.

Whilst the illustrative example shown in FIGS. 5 and 6 relates to utilising the alignment device (10) in a conventional builders level it is clear that the alignment device (10) can be utilised in a number of different applications and, in particular, within the field of power tools and notably power drills.

A desirable feature of the act of drilling a hole in a wall is to ensure that such a hole is either horizontal (or if in a ceiling, a floor, vertical) so that the fixing to be inserted in the hole may be received flush with the material being drilled. Use of a conventional bubble spirit level in this manner would create significant difficulties since, once their tool is operated the inherent and associated vibrations will cause the liquid to froth with the creation of innumerable smaller bubbles making its subsequent function impossible. Therefore, in such a situation the alignment device (10) can be inserted in a drill, FIG. 8, in a manner similar to that described for its insertion within a builders level (38) whereby the important feature when employed in a drill is that the alignment device (10) is intended to indicate when the axis of a drill bit held in a drill chuck is horizontal or vertical. In this respect, it is possible that at least one half (12*a* or 12*b*) of the alignment device may be moulded integrally with the clamshell of the power tool. In addition, the utilisation of a fibre optical cable (36) allows the level indicator (10) to be positioned anywhere within the drill body wherein the viewing window (40) can be positioned at any position of the clamshell desirable or more beneficial to the user to view the transmission of light when level is achieved.

Figure 8:
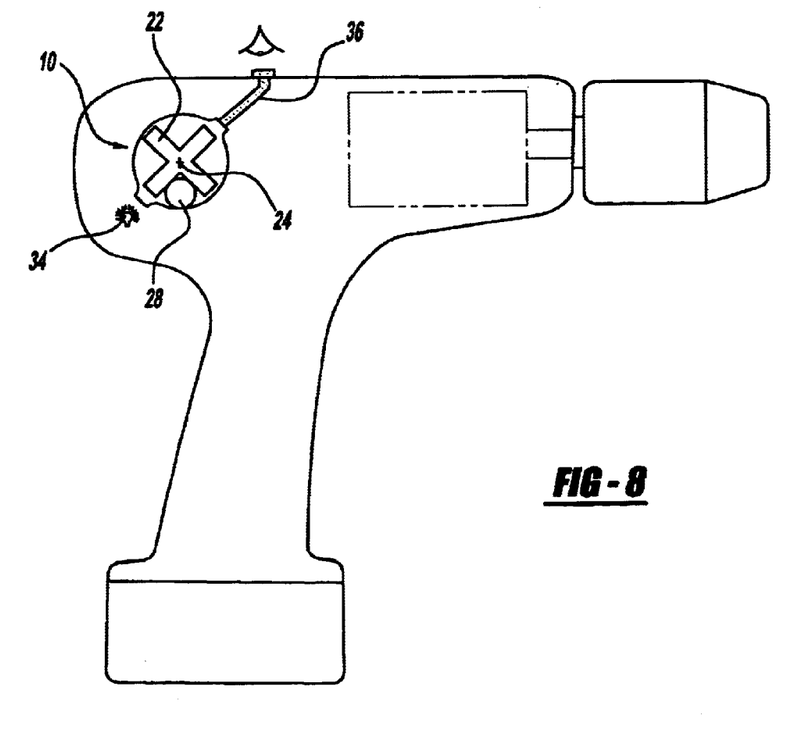
FIG. 8 is a schematic view of an alignment device of FIG. 1 used as a level indicator in a power drill.

Alternatively, as now shown in FIG. 8, a power tool such as a drill may utilise an infrared (or ultraviolet) detector (such as an infrared transistor) to produce infrared radiation instead of visible light. Similarly, the detector means disposed at the output port of such an alignment device (10) consist of an infrared detector such as a pin diode or other form of conventional infrared detector which emits an electrical signal responsive to detection of infrared radiation. The electrical input of such a detector is then processed through conventional electronic circuit (details of which are not provided herein but may be standard within the art), and which circuit will then activate an output signal which can be determined by the end user. Such an output signal could be visual (e.g. a lightbulb or LED) or audible.

The current design provides a simplistic and cost-effective manner of providing a clearly visible alignment device to indicate when a horizontal or vertical alignment has been achieved. However, it will be appreciated that this basic inventive concept may be subject to a number of variations and modifications without affecting the overall scope of the invention.

In particular, the sensitivity of the alignment device can be varied, as desired by the manufacturer, by control of the thickness of the light transmitting path of the element (22). For example, if the input port and output port have diameters of 3 mm and the corresponding element (22) also has a diameter of 3 mm then, provided at least part of the outermost face of the arm of the element (22) overlaps at least partially with the input and output ports then light will be transmitted between the ports. This will allow light to be transmitted between the ports over a 3 mm displacement range of the element (22) in either direction about the pivot point. The exact amount of angular displacement of the element (22) to effect such 3 mm displacement will of course be dependent on the length of the element (22) and, in particular, the length from the outer face of the arm and the pivot point. The longer such length then the smaller angular displacement required to displace the outer face by 3 mm. Thus the sensitivity of the alignment device (10) can be carefully controlled by the dimensions of the alignment device (10) and, in particular, the size of the light transmitting element (22) and the size of the input and output ports (18, 20). Thus the exact sensitivity of such an alignment device can be varied dependent on the user requirement.

If required, the end faces of each of the arms of the element (22) may be covered by a opaque material having a narrow slot or small hole formed therethrough to correspond with an associated slot through an opaque material mounted across one or both of the input and output ports (18, 20). This will provide for a higher degree of sensitivity whereby light would be transmitted only upon substantial exact alignment of such slots or holes between the ports and element (22) is achieved, with no light being transmitted when the alignment device is even slightly out of alignment.

Alternatively, a lower degree of sensitivity may be required and here light may be desired to be transmitted when the alignment device member (22) is within a few degrees either side of exact alignment with the input and output ports (with reference to use in a level indicator, this would represent a tolerance of several degrees either side of the vertical of horizontal planes being detected). In this situation, light will begin to be transmitted when partial alignment between the input/output ports and the transmitting element (22) is achieved, whereby the intensity of transmitted light will increase to a maximum when a perfect alignment is achieved allowing light to be transmitted through the whole of the thickness of the light transmitting element. This provides the advantage in an alignment device whereby it is often desirable to understand when alignment is being approached (or, in a level indicator, when the horizontal of vertical planes are being approached) so that a fine adjustment can be carried out near the desired alignment. Here, light intensity will be indicative of approaching alignment.

The above description relates to the basic principle of an embodiment of an alignment device of the present invention, but there are significant variations and improvements which may be achieved whilst maintaining the basic inventive concept. In particular, the above embodiment describes the use of a light transmitting element (22) to transmit light from an input port to an output port (18 and 20) in order to recognise when the alignment has been achieved. However, what is important with an alignment device of this type is the recognition of alignment of the light transmitting element with the input and output ports (18 and 20). As previously described element (22). should be regarded as a signal transmitting element for transmitting a signal between the input and output port upon alignment therebetween. This signal may be optical, electrical or employ other forms of electromagnetic radiation such as infrared or ultraviolet radiation (with appropriate detectors). For example, a similar function could be achieved by the use of an electrical conducting element to replace the light conducting element (22) whereby alignment of such a conducting element between the input (18) and output ports (20) could be signalled by transmission of an electrical current from an input terminal at the input port (18) to a corresponding output terminal at the output port (20). This could be effected by replacing the translucent or transparent elements (21a, 21b) with insulated conductive elements for engagement with corresponding carbon brushes or other electrical contact elements at the input and output ports respectively. Thus, when alignment is achieved, a current will be transmitted through the element (22) from the input port to the output port whereby the output current could then be used to power a light source or other indicator such as LED or light bulb to indicate that the level has been achieved.

Figures 7A, 7B, 7C:
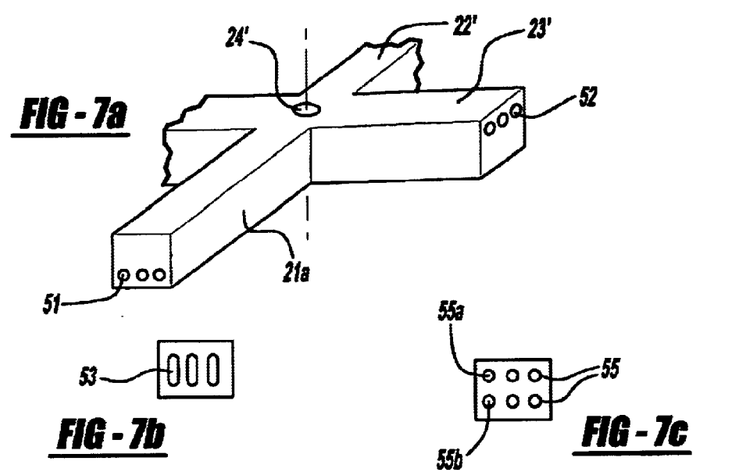

In particular, and with reference to FIGS. 7a–7c, the use of electrical contact elements provides for alternative embodiments in displaying the alignment indication. FIG. 7a shows an alternative embodiment of a signal transmitting element (22') operated on a similar principle to element (22) as shown in FIGS. 1 through 6 which is again rotationally displaceable about an axis (24'). In this embodiment the mechanical displacement of the element (22') is effected similarly to that as previously described. However, the element (22') may be made of a non-conductive material, such as plastics, having a series of electrical wires or connections (51, 52) extending therethrough between the diametrically opposed pairs of arms. In this particular embodiment each of the two pairs of arms may have wires disposed respectively in two different planes one above the other so that the wires (51) in arms (21') are lower than the wires (52) extending through arms (23') as is clearly shown in FIG. 7a. The input terminals at the input port (18') are shown in FIG. 7b and comprise three elongate terminals which are engageable with the both sets of contact wires (51 or 52) so that during alignment of either arm (21' or 23') the respective wires contained in such arms will contact the electrical elements (53) at the input port (18'). Referring then to the output port as shown as FIG. 7c, this will comprise an array of upper and lower contact elements (55a, 55b) the upper elements (55a) to engage with corresponding wires (52) in arm (23') whereby the lower elements (55b) will be contacted by the corresponding using (51) in arm (21'). In such an embodiment the contact elements (55a) will be in electrical contact with a series of corresponding LED indicators of a first colour whereby the lower elements (55b) will be in electrical contact with an array of LED indicators of a second colour. Thus, alignment of the first set of arms with the input/output ports will be indicated by a first coloured LED whilst alignment of the second set of arms will be indicated by a second colour LED.

It will be further appreciated from the embodiments shown in FIG. 7a that each of the arms has a series of three wires for engagement with three corresponding contact elements on both the input and output ports (53, 55) respectively. This is a further enhancement of the current invention to provide additional sensitivity when approaching alignment between the arms and ports. In such a situation as alignment is approached, the arms (23 or 21') will be moved into alignment between the input and output ports. As alignment is initiated a first of the wires (51, 52) will effect electrical engagement between one of the input and one of the output ports to light up one of the associated LEDs. Further rotation will then effect engagement between two of the input and output contact elements to light up two LEDs and eventually when perfect alignment is achieved (indicative of measuring a horizontal or vertical plane) complete alignment between the three input and three output electrical connections will be effected through the element (22') to light up all three associated LEDs. When such an alignment device is used or a level indicator, then dependent on which colour LEDs are lit up, the user will be able to determine whether the horizontal or vertical alignment has been achieved. The advantage of this sensitivity is that the user will be notified by one LED when alignment is approaching whilst the indication of which particular LED is lit up can be further utilised to indicate which direction further rotation or displacement of the alignment device or level (38) is required to approach full alignment with a horizontal or vertical plane.

Whilst the preferred embodiments herein have referred to the utilisation of a visible light source to be transmitted from the input port (18) to the output port (20), such visible light source to be then transferred via a fibre optical cable to an exterior viewing window, it will be appreciated that the use of visible light is not an essential element to the present invention.

In particular, the use of a fibre optical cable to transmit the visible light received at the output port (20) to a viewing window could be replaced by the use of a light sensitive diode (pin diode) in the form of a photo-electric sensor. Such light sensors are common electronic components and will not be described in any detail here serve for its functional purpose which is to provide an electric output in response to receiving a light signal of a predetermined wave length whereby such electrical output is then used to drive an electronic circuit, which circuit switches on an indicator means and are usually in the form of a visual light through an LED or lightbulb (although it is envisaged that instead of a visual output as an indicator of alignment, an audio output could be produced from a loud speaker to provide an audible signal to the end user that alignment has been achieved). In addition, the use of visible light is again not a restriction of the current invention and it is envisaged that ultraviolet or infrared radiation could also be employed to transmit a signal from the input port to the output port via a signal transmitting member (22) but where infrared radiation or ultraviolet radiation is employed then the light source at the input port will need to be replaced by an appropriate infrared emitter or ultraviolet emitter as appropriate and the detector employed at the output port will need to be an infrared or ultraviolet detector accordingly.

Where such light sensitive (including ultraviolet/infrared radiation) detectors are utilised to generate an electrical output then such common components utilising pin diodes are also responsive to the intensity of radiation received thereon. In particular, the electronic circuitry used to amplify the output of such sensor and to switch on an appropriate indicator means, may comprise appropriate means to provide an output not only indicative of receipt of the appropriate radiation but also indicative of the intensity. As previously described, for an alignment member or signal transfer member of a large diameter, the intensity of transmitted light will increase as full alignment is approached. Thus the intensity of radiation received can be analysed by an appropriate circuit to provide an appropriate output signal reflective of the increase in intensity as full alignment is approached.

The embodiment as shown in FIGS. 7a, b and c can be further adapted for an optical alignment device (10) similar to that described with reference to FIGS. 1 to 6 whereby instead of the element (22) comprising simply a translucent or transparent light transmitting material, the wires utilised in FIG. 7a may be replaced by fibre optical elements whereby the electrical contacts described with reference to FIG. 7b and FIG. 7c may be replaced by light transmitting and detecting medium similar to those described with reference to the embodiment described in FIGS. 1 through 6.

Furthermore, if electrical contact wires or fibre optical elements are utilised, as described above, then the necessity for the input and output ports to be diametrically opposed about the central axis is no longer necessary since all that is required is alignment between the input and output ports and the signal transmitting elements (22, 22') and thus curved transmitting elements (21, 23) may be utilised if so required.

In its simplest embodiment, the alignment device of the current invention simply requires a body having a concave track and a pivotally mounted member which engages with the ball bearing so as to be pivotally displaceable in response to displacement of the bearing along the track. The pivotally mounted member requires an alignment member (or signal transfer member) to extend between a first and second alignment port whereby alignment between the alignment member and the alignment ports is indicative of a required orientation of the alignment device, and an external indication means such as a light source audible warning is required to notify when such alignment is achieved. It is not essential to have a circular or toroidal track but merely a concave track whereby a bearing may find an equilibrium position under the influence of gravity. It is further not necessary for the alignment member to lie co-axial with an axis of the track, but merely requires that the bearing is maintained in a non load bearing engagement with the alignment member along the entire length of the concave track. In the preferred embodiment, this is achieved by use of a circular track and a cross element, although it will be appreciated that a slideable connection could be maintained between the bearing and an arm of the alignment member to allow relative displacement of the bearing along a radial length of the pivotal alignment member.

Figure 9A:
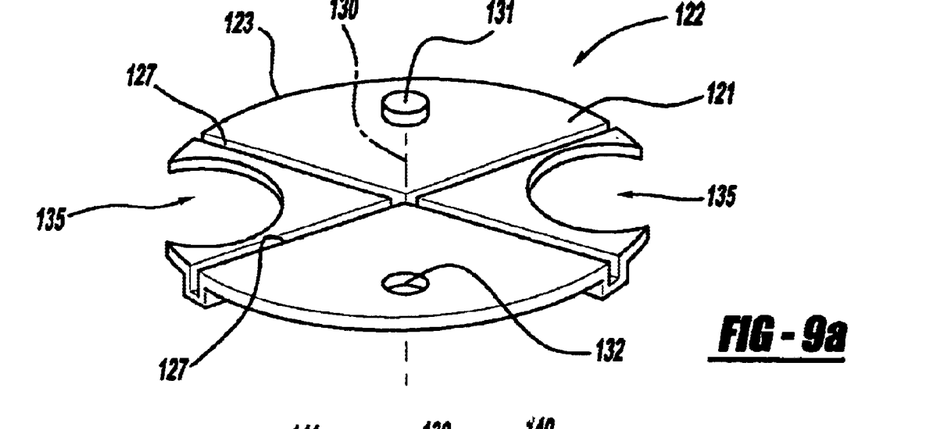
FIGS. 9a and 9b are perspective views of the inner and outer sides of an alternative alignment member for use in an alignment device of FIG. 1.
Figure 9B:
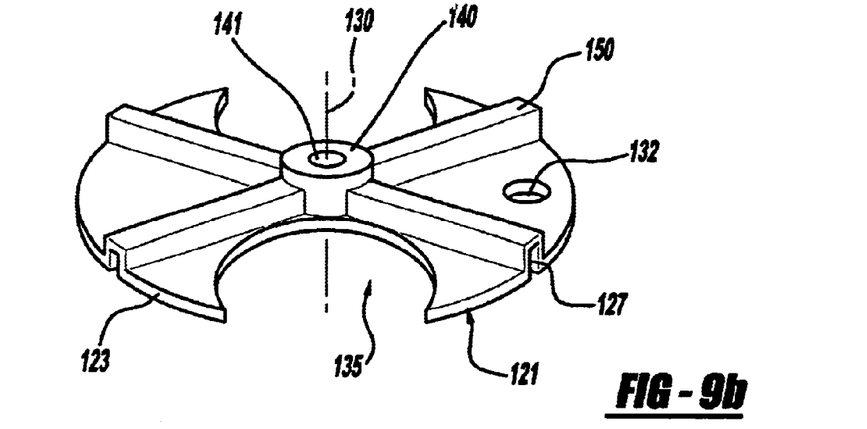
Figure 9C:
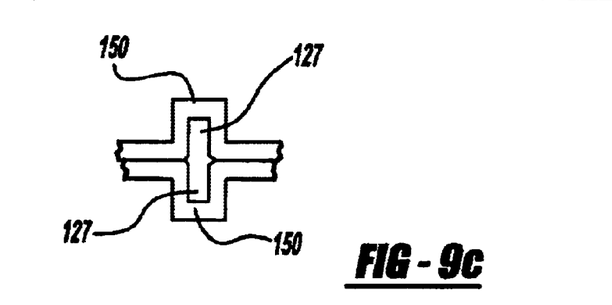
FIG. 9c is a cross-sectional view showing alignment of the channels of the alignment member of FIGS. 9a and 9b.

In a further modification to the present invention, the cross shaped alignment member (22) may be replaced by a substantially disc shaped element (122) as shown in FIGS. 9a through 9c. The disc shaped element comprises two substantially identical halves (123) which are press fitted together to form a single disc (122).

FIG. 9a shows an inner surface (121) of the disc half (123), each disc half having two channels (12&) formed in the surface (121) to both extend through a central axis (130).

These two channels extend perpendicular to each other to effectively quarter the disc. Formed within two of the diametrically opposed quadrants of each disc, half radially equidistant from the axis (130) is a first substantially circular projection (131) and, opposite thereto a, substantially circular corresponding hole (132). The other two opposed quadrants comprise two identical recesses (135) formed in the periphery of such disc half.

Referring to FIG. 9b, it is seen that the outer side of each disc comprises a central hub (140) having a cylindrical opening (141) mounted co-axially therewith. In addition, each of the channels (127) formed in such discs have a projecting channel mounting (150). Each of the two halves (123) are manufactured in an identical plastics mould, whereby the two inner faces (121) are then brought into engagement with each other such that the projection (131) on a first disc half is received within the hole (132) of the opposed disc half in a co-operating fit to restrain the two halves together as a single disc unit (122). In this manner, the channels formed on one half of the disc overlie exactly the channels formed on the other half of the disc (as seen in FIG. 9c) to form a single disc having two channels disposed at 90° to each other. These channels form signal carrying members equivalent to the arms of the member (22) previously described, in that they allow transmittal of a light signal diametrically across the disc. In addition, it will be appreciated that the cut outs (135) of one half of the disc overlie exactly with the cutouts (135) of the other half.

The mountings (150) for the channels provide the disc (122) with an appropriate width which prevents light from being transmitted across the alignment device in which such a disc is placed. Thus light may be only transmitted from an input port to an output port of an alignment device through the channels (150) formed between the two discs. In this manner the disc operates very similar to that of the cross (22), shown in FIG. 1, with the exception here that the ball bearing (28) will be received in one of the rebates (135) formed in the periphery of the disc. Again this serves the function that no axial load is transmitted from the ball bearing (28) to the axis (130) of the alignment member. This particular design provides an additional advantage allowing the production of relatively small components having transversely extending channels therethrough. It will also be appreciated that since the disc (122) is made of two identical halves, it will be perfectly balanced and moment free about its axis.

The bearing member (140) provides for axial rotational movement of the disc within the alignment device (10) by receiving appropriate axial pins from the two halves (12a and 12b) of the body.

Furthermore this particular designs allows a simplified manufacturing process to vary the sensitivity of the alignment device. As seen in FIG. 9c, when the two disc halves are placed together, the resulting channel has an accumulative width for both individual channels. Thus by varying the dimensions of the channel formed in the mould, then the sensitivity of this alignment device can be varied by varying the cross section of the channel relative to the input/output port as previously described. In addition, whilst the embodiment shown in 9a to 9b relates to a light transmitting channel, it will be appreciated that such channel could be infilled with an electrically conductive material to provide for transmission of electrical signal in a manner previously discussed.

It should also be appreciated that whilst a preferred embodiment described herein relates to an alignment device having an input port and an output port diametrically opposed about the axis, this is not essential. The signal to be transmitted may be transferred via a curved path, i.e. an electrical current or light transmitted through a fibre optical cable. Again in its simplest embodiment, the pivot point of the alignment member itself may be considered an input port, e.g. an electrical contact, whereby the signal transmitting member simply connects this input port pivot point to a second part of the alignment member, the alignment device only requiring therefore an output port to receive a signal from the alignment member when alignment is achieved. In this manner, alignment between the alignment member and the input port is constant i.e. non dependent on the pivotal movement of the alignment member. In such an embodiment, it is only necessary to achieve alignment between the alignment member and an output port in order to transmit a signal to the output port in order to generate an external indication of alignment.

Furthermore, whilst the embodiments described have utilised a ball bearing following a circular path, as determined by the gravitational forces exerted on such a ball bearing, a further embodiment of the present invention may utilise a fluid filled alignment device (10) (having input and output ports sealed to retain the fluid within the internal cavity of alignment device (10)), whereby the ball bearing is replaced by a lightweight ball, either hollow and air filled or otherwise adapted to have a density less than the liquid contained within the alignment device (10). In this manner, a ball held in such a liquid will wish to float to the top of the spherical path of the alignment device (in a similar but opposed manner in which a ball bearing is displaced by means of gravity to the lowest point of the circular track (14)). However, the principle of using a ball to float to the highest point of the track (14) so as to displace the element (22) is functionally equivalent to the ball bearing system described with reference to FIGS. 1 through 7 and simply represents an alternative embodiment, whereby the ball still follows the track under the influence of gravity to seek an equilibrium position.

A further alternative will be to replace the ball bearing with a flat circular disc, which will be free to rotate about the track defined by the outer circumference of the alignment device (10) in a manner similar to the rotational displacement of the bearing (28).

In addition, the embodiments above have referred to use of a toroidal track being completely circular to allow movement of the bearing thru 360°. However, the alignment device (10) could be limited to simply measuring or detecting one alignment position. Here, the track defined by the alignment device (10) about which the bearing moves could be limited to a quarter circle or less. In such an embodiment, the bearing will encounter a restriction at the extremes of such a quarter track where it would displace the element (22) out of alignment. However, as alignment is approached the ball would again be displaced by gravity to the lowest point on the track and effect alignment of the element (22) and ports (18, 20) in the manner previously discussed.

Finally, the above embodiments have described the use of a substantially cross-shaped element (22) to be utilised to indicate when alignment has been achieved indicative of when either the vertical or horizontal plane has been detected. However, it will be appreciated that although such embodiment requires one of the pairs of arms to communicate between the input and output ports to indicate when either of the horizontal or vertical have been detected, it is also envisaged that more than two pairs of arms can be utilised which can be used to indicate, for example, incremental angular settings such as 45° to the horizontal and vertical, 10° to the horizontal and vertical, etc. The only requirement being that the pairs of arms of the element (22) be so orientated as to communicate between the input and output ports when a specific predetermined angular alignment is achieved. It will be appreciated that where more than two pairs of arms are utilised in the element (22) then the diameter of the ball bearing relative to the length of each of the arms will have to be reduced to maintain freedom of movement of the bearing within the track (14). In addition, the diameter of the track will also have to be increased.

Where an alignment device (10) of the type described herein is used as a level indicator within a power tool, then such a level indicator requires a power source. Such power may simply be required to switch on a light at the signal input port, or it may be required to both provide the input signal and also to power the electronic circuitry used to convert a signal from a signal detector at the output port to generate an output indication of alignment. However, a power tool, and particularly drills, have been ergonomically designed so as to be comfortable for the end user and allow for ease of operation. Furthermore, there has been a significant increase in the use of cordless power tools utilising battery packs as power sources are a finite source of energy then it is desirable to utilise such energy to its optimum efficiency and certainly not to allow drain of such batteries when the power tool is not in use.

In the present invention the use of alignment device (10) as a level indicator in a power tool provides a secondary electrical function requiring power. The primary function requiring power is obviously operation of the motor to rotate the drill bit. In addition, one of the primary requirements for the use of a level indicator in a drill is to indicate when a drill bit is level before the operator starts to drill the hole and then to maintain an indication that the tool is still level as continued drilling occurs.

Where two electrical functions have been employed within a power tool historically, such as the use of a light or torch mounted on the drill, such second electrical functions have required a second switch which may be simply toggled from an on to off position and vice versa. This creates an ergonomic problem whereby the switch must be mounted on the body, usually remote from the handle making it a two handed operation and, secondly, since the use of the second electrical function is not dependent on the first electrical function the light has often been left on and, in the case of a battery powered tool, failing to switch off the light can drain the batteries and thus reduce optimum efficiency of the power tool. However, in the present invention. there is provided a modified trigger type electrical switch for use in a power tool of the type conventionally used in electric drills.

Figure 10:
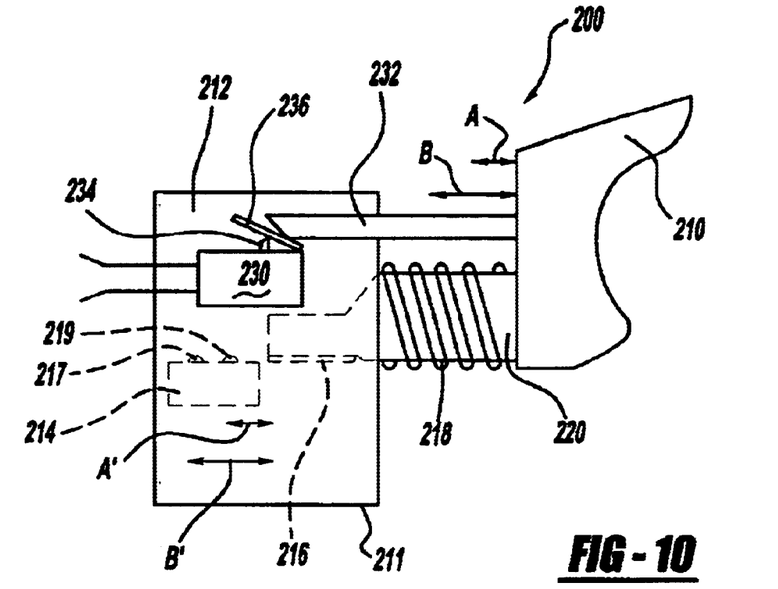
FIG. 10 is a schematic view of a modified trigger switch for a power tool.

Referring now to FIG. 10, there is provided a trigger switch (200) comprising a trigger (210) mounted on a switching box (211), which switching box being rigidly mounted to the clamshell of a drill or other type of power tool (not shown). The trigger switch (210) comprises a first elongate member (220) extending between the trigger (210) and the switching box (211), which member is restrained for longitudinal displacement into and out of a guide channel (not shown) in the box (211) in a conventional manner. The trigger (210) is resiliently biased into an unactuated position shown in FIG. 10 by use of a spring member (218) (which although shown externally here may be mounted internally in the box 211). In this manner the trigger (210) is held so as to be remote from the box (211).

In a conventional switch of this type an end user would grip the handle of a power tool and use a forefinger to "squeeze" the trigger (210) to displace the member (220) into the switching box (211) whereby completion of a switching circuit is achieved as the element (220) is moved into engagement with appropriate switching elements shown schematically as 214. To simplify the understanding of this invention without imposing any undue restriction, we have schematically shown the operation of the main switching function here by indicating that the member (220) has an electrical contact plate (216) which completes an electrical contact between two contact elements (217, 219) to complete an electrical circuit to allow power from a power source, such as a mains power source or a battery power source, to be transmitted to the motor of the power tool, to switch the power tool on. If the trigger switch (210) is subsequently released by the end user the spring member (18), which has been compressed during activation, then applies its resilient biasing force to move the trigger away from the switching box (211) to break the electrical contact between the contacts (217, 219). It will be appreciated that this explanation of the operation of the trigger switch is extremely simplified and it will also be appreciated that many conventional trigger switches now used to provide variable power to a motor, whereby a rheostat may be used to gradually increase power transfer through the switching box (211) from the battery pack to the motor to gradually increase motor power and thus output speed dependent on the degree of actuation of the trigger switch. However, such trigger switch configurations are standard.

The current invention resides in adapting the trigger switch (200) to achieve a secondary switching function to operate the second electrical operation of the power tool, and in this particular case activation of the level indicator as previously described.

Referring again to FIG. 10 a second longitudinally extending element (232) is further securely attached to the trigger (210) whilst a second electrical switch (230) is mounted on the external surface of the switching box (211), and then securely mounted relative to the clamshell of the power tool. The second switching element (230) comprises a simple depression switch (234) which can be depressed into an actuated position by pivotal lever (236), which lever (236) abuts an end of the longitudinal element (232). As shown in the unactuated position in FIG. 10 the element (232) abuts but does not affect depression of the lever (236) and thus the switch (234) remains in an unactuated position. However, minimal activation and displacement of the trigger (210) as indicated by the arrow A in FIG. 10 will be sufficient to move the element (232) a distance sufficient to effect pivotal displacement of the member (236) to depress the button (234) and thus activate the second switch element (230). The second switch element (230) simply provides for an electrical connection between the battery and a level indicator as previously described.

It will be further appreciated that movement of the trigger switch (210) a distance A (corresponding to displacement of the main member (220) a distance A') is insufficient to activate the main switching element (211) by failing to complete contact between the elements (214, 219). Further displacement of the trigger switch (210) a distance B, (causing movement of the element (220) distance B') will be sufficient to complete the main switching circuit. However, displacement of the trigger switch (210) a distance B will maintain the element (232) in contact with the pivotal member (236) and thus maintain the switch (230) in an actuated position.

When the trigger switch (210) is released the member (220) is first moved, under the biasing of the spring, out of engagement with the elements (217, 219) to break the main electrical switching circuit before the element (232) is moved out of engagement with the second switch (230). In this manner operation of the trigger switch (210) firstly actuates the first switching element (230) to provide power to the level indicator and serves to maintain power to the level indicator as the power tool itself is subsequently actuated by continued displacement of the trigger. Once drilling operation has been completed the end user will then release the trigger in turn breaking the switching contact to stop power reaching the motor and only then will the member (232) move out of engagement with the second switch (230) to switch off power to the level indicator.

In this manner an operator of a drill will be able to first align the drill to the correct level by operation of the level indicator, subsequently drill the appropriate hole, and then switch off both the power tool and the level indicator. This prevents the need to operate a second switch on the power tool whilst automatically ensuring that when the tool is not in use and no pressure is being applied to the switch then no power drain is employed by accidentally leaving the lever indicator switched on.

It would be appreciated that the description of the trigger switch typed above is purely by way of example only and simply requires the inclusion of the member (232 and 230) to a conventional trigger switch to provide a second switching operation upon a single actuation of a trigger switch. The exact nature and operation of the conventional trigger switch may vary and reflect those trigger switches known in the art.

It is to be appreciated that the utilisation of this particular type of switching mechanism in a power tool having a level indicator of the type previously described, is equally applicable to a power tool utilising any and all types of electrical level indicators.

Figure 11:
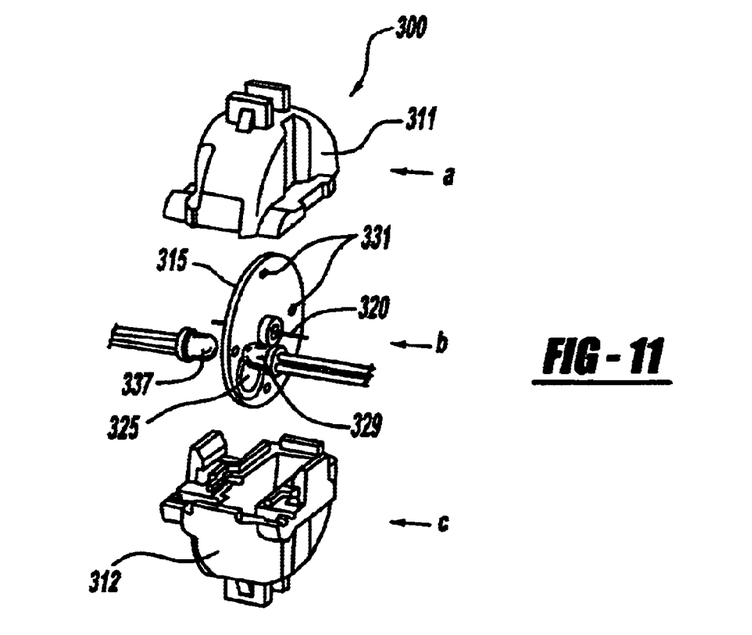
FIG. 11 is a simplified alignment device for use as a level indicator in a power tool.

Therefore, the level indicator as previously described may be replaced by a more simplified embodiment as shown in FIG. 11. The level indicator as shown in FIG. 11, in exploded form, simply discloses a cylindrical housing comprising a top housing (311) and a bottom housing (312) which are mated together (snap fitted) to form a substantially cylindrical chamber which receives a circular disc (315) which disc (315) has an axially mounted pivot pin (320) extending from either side of the disc. This pin (320) is received within recesses between the top and bottom housing to axially mount the disk for rotation within the housing. This disc further comprises a biasing weight (325) which causes the disc to be displaceable under the action of gravity to seek an equilibrium position.

The level indicator (300) further comprises a signal generator, in this particular case an infrared transistor (337) and a signal receiving member (329) in the form of an infrared detector, one each disposed either side of the disk within the housing. The disc further comprises four pin holes (331) extending therethrough such that a predetermined orientation of the disc relative to the housing (311) will allow infrared radiation to be transmitted through the pin hole to the receiver to activate an indicator, such as an external light source, in a manner similar to that previously described in relation to the alignment device (10).

This device provides an output signal indicative of the holes in the disc (315) aligning with the transmitter/signal receiver devices (337, 329). It provides a similar function to that previously described and alignment device (10) and it will now be appreciated that indicator (300) may be inserted in a power tool that such alignment is achieved when the power tool is disposed in a predetermined horizontal plane (usually determined by the output axis of the motor).

If the body is rotated relative to the weighted disc to a second predetermined distance, a second pin hole may then be disposed between the signal transmitter and receiver and again an indicator provided that a second alignment has been achieved. In this manner, as this type of level indicator is placed into a tool such that when the power tool is in a predetermined horizontal or vertical plane. The vertical plane will be determined 90° relative to the horizontal by placement of the pin holes at 90° relative to one another about the periphery of the disc. Again alignment will be achieved when the axis of the drill motor lies in a horizontal or vertical plane. In this manner the signal indicator (300) operates similarly to that previously described although the displacement of the disc in this embodiment is achieved by direct biasing of such pivotal member. However this embodiment (300) is given by way of example only as an alternative form of level indicator which may take advantage of use of the trigger switch (200) in a power tool.

What is claimed is:

1. An alignment device comprising:
    a first component part comprising a main body having a concave track and a track following member restrained in engagement with and displaceable about said track to follow said track under the influence of gravity to seek an equilibrium position;
    a second component part comprising an alignment member pivotally mounted within said body and restrained in engagement with said track following member so as to be directly pivotally displaceable in response to displacement of said track following member;

said device further comprising a first alignment port and a second alignment port in said body and indicator means for providing an indication when said alignment member is in a predetermined alignment with both first and second alignment ports.

2. An alignment device as claimed in claim 1, wherein the track is arcuate and disposed about an axis and said alignment member being mounted and rotatable about said track axis so as to be displaceable about said axis in response to displacement of said track following member.

3. An alignment device as claimed in claim 2 in which said arcuate track defines a complete circle about said axis.

4. An alignment device as claimed in claim 1 in which the track following member comprises a sphere.

5. An alignment device as claimed in claim 1 in which said track comprises a channel in which said track follower means is restrained by inner and outer walls of said channel.

6. An alignment device as claimed in claim 1 in which said first alignment port comprises a signal input port and said second alignment port comprises a signal output port and said alignment member comprises a signal carrying member to effect transfer of a signal from input port to output port when alignment is achieved.

7. An alignment device as claimed in claim 6 further comprising indicator means which is activated in response to a signal being transferred from said input port to said output port to provide an external detectable indication of alignment.

8. An alignment device as claimed in claim 7 in which said indicator means comprises a light-emitting terminal which provides said external indication.

9. An alignment device as claimed in claim 7 wherein said input port comprises a signal generating means and said output port comprises a signal detector means.

10. An alignment device as claimed in claim 9 in which said signal generator means comprises an electromagnetic radiation emitter and said signal detector means comprises an electromagnetic radiation detector.

11. An alignment device as claimed in claim 10 in which the signal-carrying member comprises an electromagnetic radiation-carrying member.

12. An alignment device as claimed in claim 10 further comprising an electronic control circuit which is activated in response to a signal received from the detector means to provide said external indication of alignment.

13. An alignment device as claimed in claim 6 in which said first and second alignment ports are diametrically opposed about the axis of the track and said alignment member comprises at least one substantially straight axially mounted alignment bar which, upon alignment, extends between said ports.

14. An alignment device as claimed in claim 13 comprising an additional alignment bar disposed at right angles to the other whereby alignment of the alignment members and ports occurs when either alignment bar extends between said ports.

15. An alignment device as claimed in claim 14 in which at least one alignment bar comprise said signal carrying member.

16. An alignment device as claimed in claim 14 wherein said track following member is restrained in engagement with both said alignment bars.

17. A level indicator comprising an alignment device as claimed in claim 14 wherein alignment between the component parts is indicative of the body substantially identifying a horizontal line.

18. A level indicator as claimed in claim 17 comprising a reference surface fixed relative to said body for said surface to substantially identify a horizontal line upon alignment between said component parts.

19. A level indicator as claimed in claim 18 which alignment between said alignment ports and said first alignment bar is indicative of the body identifying a horizontal line and alignment between said alignment ports and said second alignment bar is indicative of the body substantially identifying a vertical plane.

20. A level indicator as claimed in claim 19 in which said reference surface substantially identifies a horizontal line upon alignment between said alignment ports and first alignment bar and substantially identifies a vertical plane upon alignment between said alignment ports and said second alignment bar.

21. A power drill having a longitudinally extending rotary output and comprising a level indicator as claimed in claim 20 which said body of said alignment device is fixedly mounted in said drill in a predetermined orientation so that alignment between said alignment ports and said first alignment bar occurs when the longitudinally extending rotary output lies substantially in a horizontal line and alignment between said alignment ports and said second alignment bar occurs when the longitudinally extending rotary output lies substantially in a vertical plane.

22. A power drill having a longitudinally extending rotary output and comprising a level indicator as claimed in claim 17 in which said body of said alignment device is fixedly mounted in said drill in a predetermined orientation so that alignment of said component parts occurs when the longitudinally extending rotary output lies substantially in a horizontal line.

23. An alignment device as claimed in claim 1 in which said alignment member comprises a circular disc having a restraining notch formed in its circumference for co-operating engagement with said track following member.

24. An alignment member for use in an alignment device according to claim 23 comprising two substantially identical circular discs, said discs being moment free about an axis extending perpendicular to and through the centre of the discs when fitted together.

25. An alignment member as claimed in claim 24 which each disc includes at least one disc channel formed diametrically across a first surface whereby engagement between the first surface of each disc aligns the at least one disc channel of a first disc with that of the other disc to form a channel through said alignment member.

26. An alignment member as claimed in claim 25 in which each disc has a projection and rebate formed from said first surface whereby engagement of the first surfaces of each disc so as to align the disc channels also aligns the rebate of one disc with the projection of the other disc to provide an interference fit between the projection of one disc with the rebate of the other disc to restrain the two discs in engagement.

27. An alignment member as claimed in claim 26 in which said projection and rebate on each disc are equidistant from the centre of each disc.

28. An alignment member as claimed in claim 27 in which each disc has first and second identical disc notches diametrically opposed about the disc whereby alignment of the discs channels of said discs aligns the first disc notch of one disc with the second disc notch of said second disc.

* * * * *